US011989411B2

(12) United States Patent
Yeh (10) Patent No.: US 11,989,411 B2
(45) Date of Patent: May 21, 2024

(54) ELECTRONIC APPARATUS AND HOTKEY PROMPT METHOD THEREOF

(71) Applicant: Acer Incorporated, New Taipei (TW)

(72) Inventor: Shu-Wei Yeh, New Taipei (TW)

(73) Assignee: Acer Incorporated, New Taipei (TW)

( * ) Notice: Subject to any disclaimer, the term of this patent is extended or adjusted under 35 U.S.C. 154(b) by 35 days.

(21) Appl. No.: 18/080,763

(22) Filed: Dec. 14, 2022

(65) Prior Publication Data

US 2024/0053885 A1 Feb. 15, 2024

(30) Foreign Application Priority Data

Aug. 9, 2022 (TW) .................................. 111129870

(51) Int. Cl.
| | |
|---|---|
| *G06F 9/00* | (2018.01) |
| *G06F 3/023* | (2006.01) |
| *G06F 3/04895* | (2022.01) |
| *G06F 9/4401* | (2018.01) |
| *G06F 11/22* | (2006.01) |
| *G06F 21/57* | (2013.01) |

(52) U.S. Cl.
CPC ........ *G06F 3/04895* (2013.01); *G06F 3/0238* (2013.01); *G06F 9/4403* (2013.01); *G06F 9/4411* (2013.01); *G06F 11/2284* (2013.01); *G06F 21/572* (2013.01)

(58) Field of Classification Search
CPC ............... G06F 3/04895; G06F 3/0238; G06F 11/2284; G06F 21/572
See application file for complete search history.

(56) References Cited

FOREIGN PATENT DOCUMENTS

| CN | 107678555 | 2/2018 |
|---|---|---|
| CN | 110069141 | 7/2019 |
| TW | 201214201 | 4/2012 |
| TW | 201351284 | 12/2013 |

*Primary Examiner* — Nitin C Patel
(74) *Attorney, Agent, or Firm* — JCIPRNET (57) ABSTRACT

An electronic apparatus and a hotkey prompt method thereof are provided. The method includes the following steps. A power-on self-test (POST) procedure of a basic input output system (BIOS) is performed. During the POST procedure, a display panel of a keyboard module is controlled to display a first keyboard layout, so as to display at least one hotkey corresponding to at least one hotkey function of the BIOS via the display panel. After a hotkey input operation is received via the keyboard, a first hotkey function of the at least one hotkey function of the BIOS is performed. The hotkey input operation is used to enable the first hotkey function. In response to performing the first hotkey function, the display panel of the keyboard module is controlled to display a second keyboard layout.

10 Claims, 6 Drawing Sheets

ELECTRONIC APPARATUS AND HOTKEY PROMPT METHOD THEREOF

CROSS-REFERENCE TO RELATED APPLICATION

This application claims the priority benefit of Taiwan application serial no. 111129870, filed on Aug. 9, 2022. The entirety of the above-mentioned patent application is hereby incorporated by reference herein and made a part of this specification.

BACKGROUND OF THE INVENTION

Field of the Invention

The invention relates to an electronic apparatus, and particularly relates to an electronic apparatus and a hotkey prompt method thereof.

Description of Related Art

Generally speaking, when a user wants to open a function menu of a basic input/output system (BIOS), the user must press a hotkey in a specific stage of performing the BIOS in the computer system. Otherwise, if the user does not press the correct hotkey at the right time, the computer system enters the operating system execution stage after completing the BIOS boot process, and the BIOS menu may not be successfully opened via the hotkey. However, since the user may not know exactly whether the computer system successfully receives the keyboard input operation of pressing the hotkey at the appropriate time, the user needs to repeatedly press the hotkey after the computer is just turned on until the BIOS menu appears on the display screen. This uncertain mode of operation is inconvenient to the user. In addition, different hotkeys or hotkey combinations also correspond to different hotkey functions, which are difficult for ordinary users to remember.

SUMMARY OF THE INVENTION

Accordingly, the invention provides an electronic apparatus and a hotkey prompt method thereof that may solve the technical issues above.

An embodiment of the invention provides a hotkey prompt method, suitable for an electronic apparatus including a keyboard module. The keyboard module includes a display panel and a keyboard having a plurality of light-transmitting keycaps, and the method includes the following steps. A power-on self-test (POST) procedure of a basic input output system (BIOS) is performed. During the POST procedure, a display panel of a keyboard module is controlled to display a first keyboard layout, so as to display at least one hotkey corresponding to at least one hotkey function of the BIOS via the display panel. After a hotkey input operation is received via the keyboard, a first hotkey function of the at least one hotkey function of the BIOS is performed. The hotkey input operation is used to enable the first hotkey function. In response to performing the first hotkey function, the display panel of the keyboard module is controlled to display a second keyboard layout.

An embodiment of the invention provides an electronic apparatus including a keyboard module, a storage apparatus, and a processor. The keyboard module includes a display panel and a keyboard, and the keyboard includes a plurality of light-transmitting keycaps disposed on the display panel. The storage apparatus records a BIOS. The processor is coupled to the keyboard module and the storage apparatus, and is configured to perform the following steps. A POST procedure of a BIOS is performed. During the POST procedure, a display panel of a keyboard module is controlled to display a first keyboard layout, so as to display at least one hotkey corresponding to at least one hotkey function of the BIOS via the display panel. After a hotkey input operation is received via the keyboard, a first hotkey function of the at least one hotkey function of the BIOS is performed. The hotkey input operation is used to enable the first hotkey function. In response to performing the first hotkey function, the display panel of the keyboard module is controlled to display a second keyboard layout.

Based on the above, in an embodiment of the invention, during the performance of the POST procedure of the BIOS, the display panel of the keyboard module may display the hotkeys corresponding to the hotkey functions of the BIOS based on the first keyboard layout. Accordingly, via the prompt of the keyboard module, the user does not need to memorize the hotkeys for enabling the hotkey functions, and does not need to repeatedly press the hotkeys in an uncertain state, thus significantly improving convenience and user experience.

DESCRIPTION OF THE EMBODIMENTS

A portion of the embodiments of the invention is described in detail hereinafter with reference to figures. In the following, the same reference numerals in different figures should be considered to represent the same or similar elements. These embodiments are only a portion of the invention and do not disclose all of the possible implementations of the invention. More precisely, these embodiments are only examples of the method and the apparatus in the claims of the invention.

Figure 1:
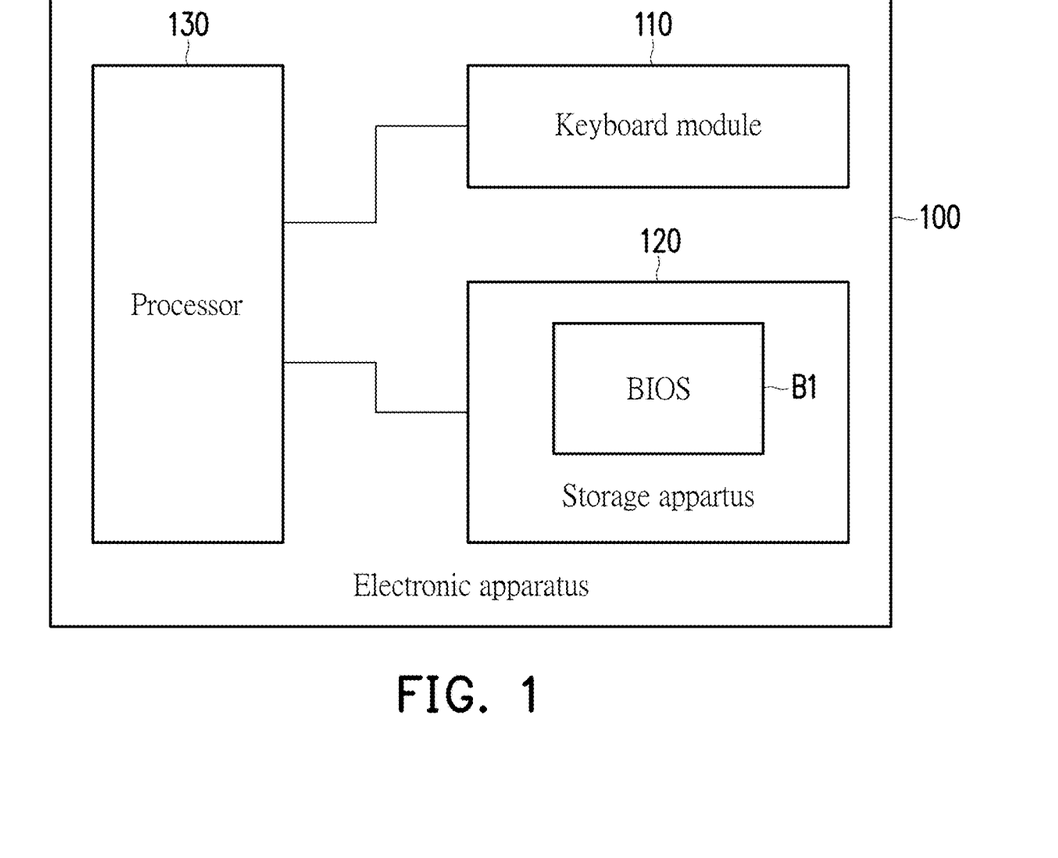
FIG. 1 is a block diagram of an electronic apparatus according to an embodiment of the invention.

FIG. 1 is a block diagram of an electronic apparatus according to an embodiment of the invention. Referring to FIG. 1, an electronic apparatus 100 includes a keyboard module 110, a storage apparatus 120, and a processor 130. The electronic apparatus 100 may be implemented as an electronic product having the keyboard module 110, such as a notebook computer. Alternatively, the electronic apparatus 100 may be implemented as an electronic product that may be externally connected with the keyboard module 110, such as a desktop computer or a tablet computer. The invention is not limited thereto.

Figure 2:
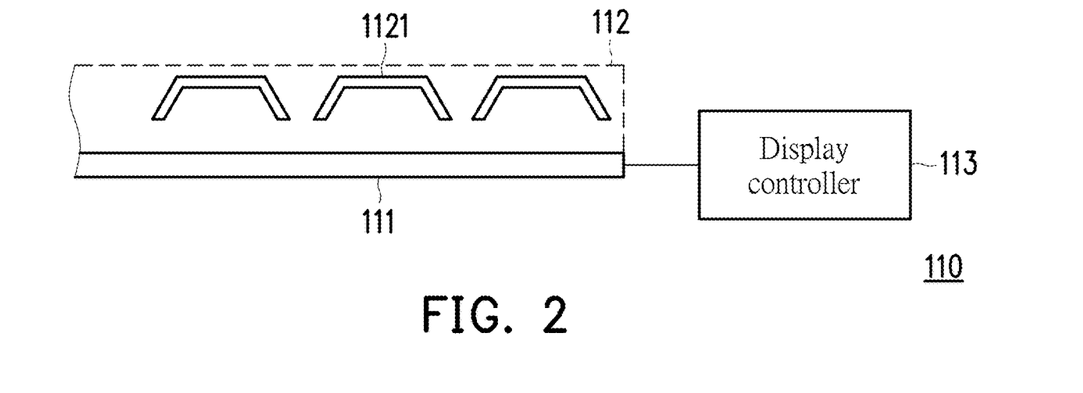
FIG. 2 is a schematic view of a keyboard module according to an embodiment of the invention.

The user may operate, control, or input information to the electronic apparatus 100 via the keyboard module 110. FIG. 2 is a schematic view of a keyboard module according to an embodiment of the invention. Referring to FIG. 2, the keyboard module 110 includes a display panel 111, a keyboard 112 having a plurality of light-transmitting keycaps 1121, and a display controller 113. The keyboard 112 is disposed on the display panel 111 and has the plurality of light-transmitting keycaps 1121.

In some embodiments, the display panel 111 may be, for example, an electronic paper or electronic ink (E-paper or E-ink) display panel, an organic light-emitting diode (OLED) display panel, or other types of display panels, and the display surface thereof faces the light-transmitting keycaps 1121, so that the user may see the image generated by the display panel 111 via the light-transmitting keycaps 1121. The display panel 111 is coupled to the display controller 113, and the display controller 113 is used to drive a plurality of pixel units of the display panel 111 to display an image. In more detail, the display controller 113 may include a source driving circuit and a gate driving circuit. The source driving circuit is configured to write a data signal to pixel units that are turned on. The gate driving circuit is configured to provide a plurality of gate signals to control the on and off of each row of pixel units.

The keyboard 112 may be formed by a plurality of key structures. The light-transmitting keycaps 1121 of each of the key structures may move up and down as the user presses or releases the light-transmitting keycaps 1121. In an embodiment of the invention, the display panel 111 may display a plurality of key characters corresponding to the key structures of the keyboard 112, so that the user may see the key characters corresponding to each of the light-transmitting keycaps 1121. It should be noted that, by controlling the display image of the display panel 111, the key characters corresponding to each of the key structures of the keyboard 112 may be changed. That is, for different application scenarios, the display panel 111 may display a plurality of keyboard layouts different from each other.

In addition, the keyboard 112 may further include a thin-film circuit (not shown) for detecting whether the key structures are pressed. However, the invention does not limit the actual structure and triggering principle of the keyboard 112, which may be designed according to practical applications. For example, the key-triggering action of the keyboard 112 may be detected by applying capacitive sensing, optical sensing, or touch sensing. In addition, for different keyboard types, in order to guide the light-transmitting keycaps 1121 to move up and down, the supporting structure of the key structures may include a spring or a scissor foot mechanism, etc., which is not limited in the invention.

The storage apparatus 120 may be a non-volatile memory, and records a BIOS B1. In some embodiments, the storage apparatus 120 may be, for example, an electrically-erasable programmable read-only memory (EEPROM). In other embodiments, the storage apparatus 120 may be, for example, a flash memory. From another point of view, the storage apparatus 120 may be a chip storing system firmware such as the BIOS B1. When the electronic apparatus 100 is powered on, the program code of the BIOS B1 in the storage apparatus 120 is executed to initialize and detect various hardware equipment on the electronic apparatus 100.

The processor 130 is coupled to the keyboard module 110 and the storage apparatus 120, such as a central processing unit (CPU) and an application processor (AP), or other programmable general-purpose or special-purpose microprocessors, digital signal processors (DSPs), or other similar apparatuses, integrated circuits, and combinations thereof. The processor 130 may access and execute the program codes recorded in the storage apparatus 120 to implement the hotkey prompt method in an embodiment of the invention.

Figure 3:
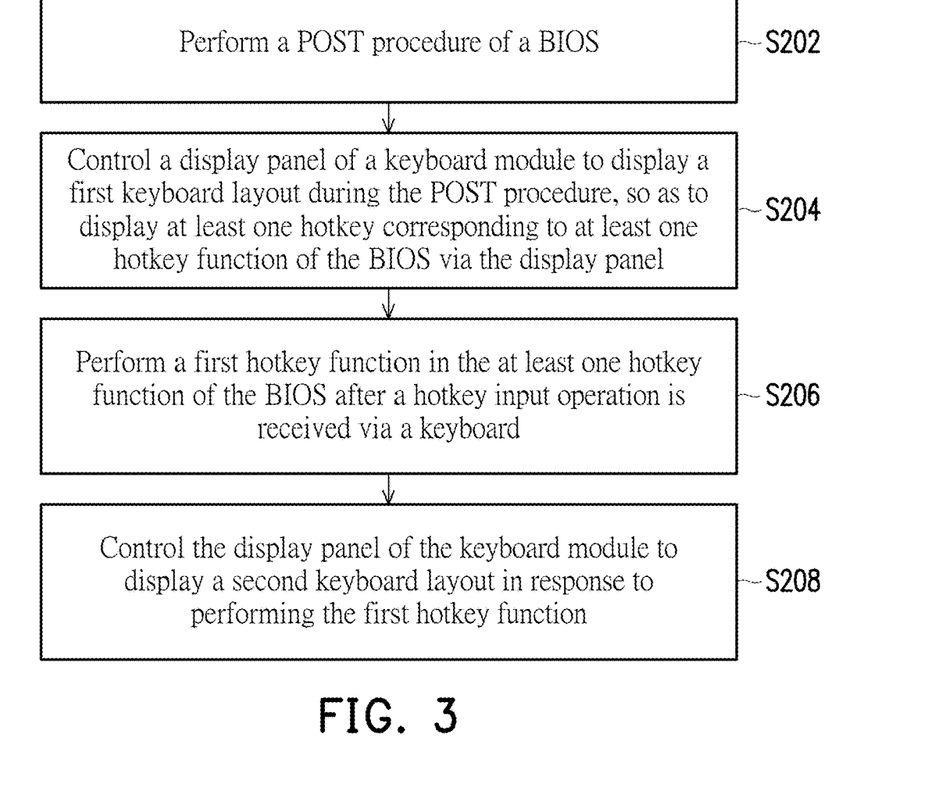
FIG. 3 is a flowchart of a keyboard prompt method according to an embodiment of the invention.

FIG. 3 is a flowchart of a hotkey prompt method according to an embodiment of the invention, and the method flowchart of FIG. 3 may be implemented by various elements of the electronic apparatus 100 of FIG. 1. Please refer to FIG. 1 and FIG. 3 at the same time. The following describes the steps of the hotkey prompt method of the present embodiment in conjunction with various elements of the electronic apparatus 100 in FIG. 1.

In step S202, when the electronic apparatus 100 is powered on, the processor 130 performs a POST procedure of the BIOS B1. Specifically, when the electronic apparatus 100 is powered on, the processor 130 starts the POST procedure in the BIOS B1, and the POST procedure is responsible for initial setting and basic testing of various hardware equipment of the electronic apparatus 100 to ensure that the electronic apparatus 100 may operate normally. The POST procedure may include a plurality of stages performed in sequence, such as security (SEC) stage, pre-EFI initialization (PEI) stage, driver execution environment (DXE) stage, and boot device select (BDS) stage.

In step S204, during the POST procedure, the processor 130 controls the display panel 111 of the keyboard module 110 to display a first keyboard layout, so as to display at least one hotkey corresponding to at least one hotkey function of the BIOS B1 via the display panel 111. In detail, the BIOS B1 performed by the processor 130 may provide a pre-configured first keyboard layout to the display controller 113, so that the display panel 111 may display the first keyboard layout.

In some embodiments, the first keyboard layout is different from the standard keyboard layout. The pre-configured first keyboard layout may be recorded in the storage apparatus 120 or a hard disk, and the invention is not limited thereto. From another point of view, the first keyboard layout may be viewed as an image displayed by the display panel 111. In some embodiments, the first keyboard layout includes only hotkeys and does not include other keys that are not hotkeys. In this way, the user may know one or a plurality of hotkeys or hotkey combinations for enabling the BIOS hotkey function via the first keyboard layout displayed on the display panel 111 of the keyboard module 110.

In some embodiments, before entering the BDS stage of the POST procedure, the processor 130 may control the display panel 111 of the keyboard module 110 to display the first keyboard layout using the BIOS B1. The processor 130 may control the display panel 111 of the keyboard module 110 to display the first keyboard layout in a pre-EFI initialization (PEI) stage or a driver execution environment (DXE) stage. In some embodiments, the processor 130 may control the display panel 111 to display the first keyboard layout in response to completing the initialization of the keyboard 112 in the DXE stage. Accordingly, when the user sees the first keyboard layout, the initialization of the keyboard 112 is completed, thus ensuring that the processor 130 does not receive the hotkey input operation issued by the user until the initialization of the keyboard 112 is completed. Or, in some embodiments, the processor 130 may control the display panel 111 to display the first keyboard layout in advance in the PEI stage, and control the display panel 111 to display prompt information to notify the user of the appropriate timing of the available hotkey input operation.

In some embodiments, the first keyboard layout includes at least one hotkey of at least one hotkey function and function description information. More specifically, when the display panel 111 displays the first keyboard layout, the display area corresponding to each of the hotkeys in the first keyboard layout displays hotkey characters, and the display areas corresponding to other keys in the first keyboard layout that are not hotkeys may be left blank to display other prompt information, or used to display the function description information of the hotkey function.

Moreover, in some embodiments, at least one hotkey of one of the hotkey functions supported by the BIOS B1 includes a first hotkey and a second hotkey forming a hotkey combination. The first hotkey and the second hotkey are presented in a first display effect in the first keyboard layout. At least one hotkey of another one of the hotkey functions supported by the BIOS B1 includes a third hotkey and a fourth hotkey forming a hotkey combination. The third hotkey and the fourth hotkey are presented in a second display effect in the first keyboard layout. It should be noted that the first display effect is different from the second display effect. That is, different hotkey combinations may be presented via different display effects, so that the user may identify and distinguish the correct hotkey combination. For example, the display effect may be display color, display brightness, font shade, or background grayscale, etc., which is not limited in the invention.

Figure 4A:
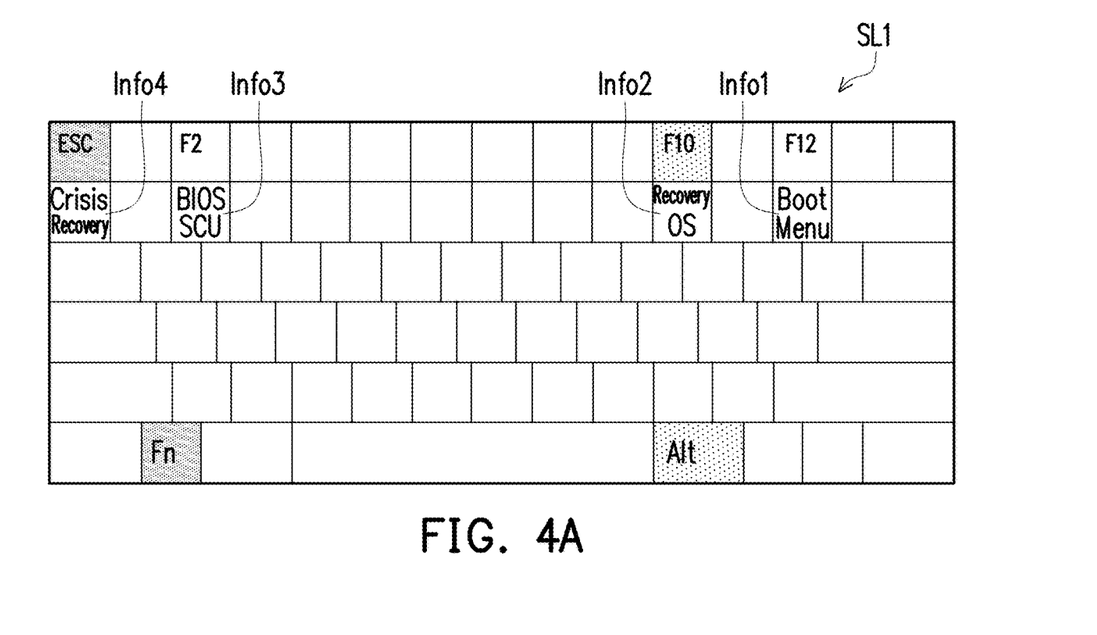
FIG. 4A is a schematic view of a first keyboard layout according to an embodiment of the invention.

For example, FIG. 4A is a schematic view of a first keyboard layout according to an embodiment of the invention. Referring to FIG. 4A, the display panel 111 of the keyboard module 110 may display a first keyboard layout SL1. The first keyboard layout SL1 includes a plurality of hotkeys corresponding to a plurality of hotkey functions and function description information Info1 to Info4 of the hotkey functions, and each of the function description information Info1 to Info4 may be presented in the display area corresponding to the key below each of the hotkeys. In this example, the first keyboard layout SL1 includes the hotkey "F12" corresponding to the hotkey function "enter boot menu" and the corresponding function description information Info1. In addition, the first keyboard layout SL1 further includes a hotkey "F2" corresponding to the hotkey function "enter setting menu (BIOS SCU)" and the corresponding function description information Info3.

Moreover, the first keyboard layout SL1 further includes a hotkey combination corresponding to the hotkey function "recovery OS" and the corresponding function description information Info2. The hotkey combination includes a hotkey "F10" and a hotkey "Alt". The first keyboard layout SL1 also includes a hotkey combination corresponding to the hotkey function "crisis recovery" and the corresponding function description information Info4. The hotkey combination includes the hotkey "Fn" and the hotkey "ESC".

In the present exemplary example, except for the display areas for displaying the function description information Info1 to Info4, the display areas of other keys in the first keyboard layout SL1 other than hotkeys are left blank, that is, no characters are displayed. Moreover, the hotkey "Fn" and the hotkey "ESC" forming the first hotkey combination are presented in the first background grayscale, and the hotkey "F10" and the hotkey "Alt" forming the second hotkey combination are presented in the second background grayscale.

Next, in step S206, after a hotkey input operation is received via the keyboard 112, the processor 130 performs a first hotkey function of the at least one hotkey function of the BIOS B1. The hotkey input operation is used to enable the first hotkey function. Taking FIG. 4A as an example, if the user presses the hotkey "F12", the processor 130 receives a hotkey input operation for enabling the first hotkey function "enter boot menu" via the keyboard 112. Next, the processor 130 controls the display screen of the electronic apparatus 100 to display the boot menu of the BIOS B1.

In step S208, in response to performing the first hotkey function, the processor 130 controls the display panel 111 of the keyboard module 110 to display a second keyboard layout. The second keyboard layout includes a standard keyboard layout, such as a QWERTY keyboard layout. Specifically, after the user issues a hotkey input operation, the processor 130 may control the display panel 111 to switch to display a standard keyboard layout, so that the user may operate the electronic apparatus 100 or input information to the electronic apparatus 100 according to the standard keyboard layout, such as operations such as selecting the boot equipment according to the boot menu of the BIOS B1.

Figure 4B:
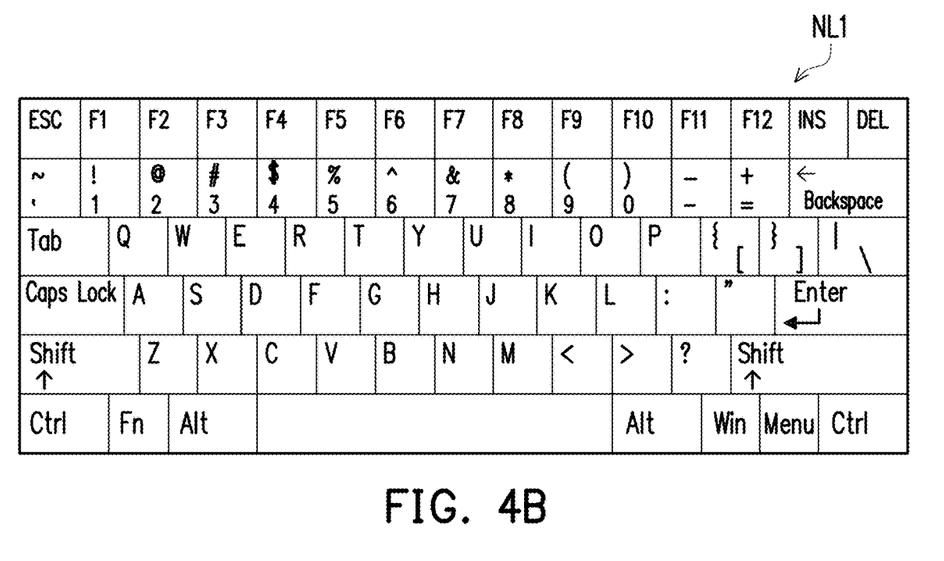
FIG. 4B is a schematic view of a second keyboard layout according to an embodiment of the invention.

For example, FIG. 4B is a schematic view of a second keyboard layout according to an embodiment of the invention. Referring to FIG. 4B, in response to the processor 130 performing the first hotkey function, the processor 130 may control the display panel 111 of the keyboard module 110 to display a second keyboard layout NL1. The second keyboard layout NL1 has twenty-six English alphabet keys, ten numeric keys, a capslock key, delete key, backspace key, insert key, shift key, and other function keys.

Figure 5:
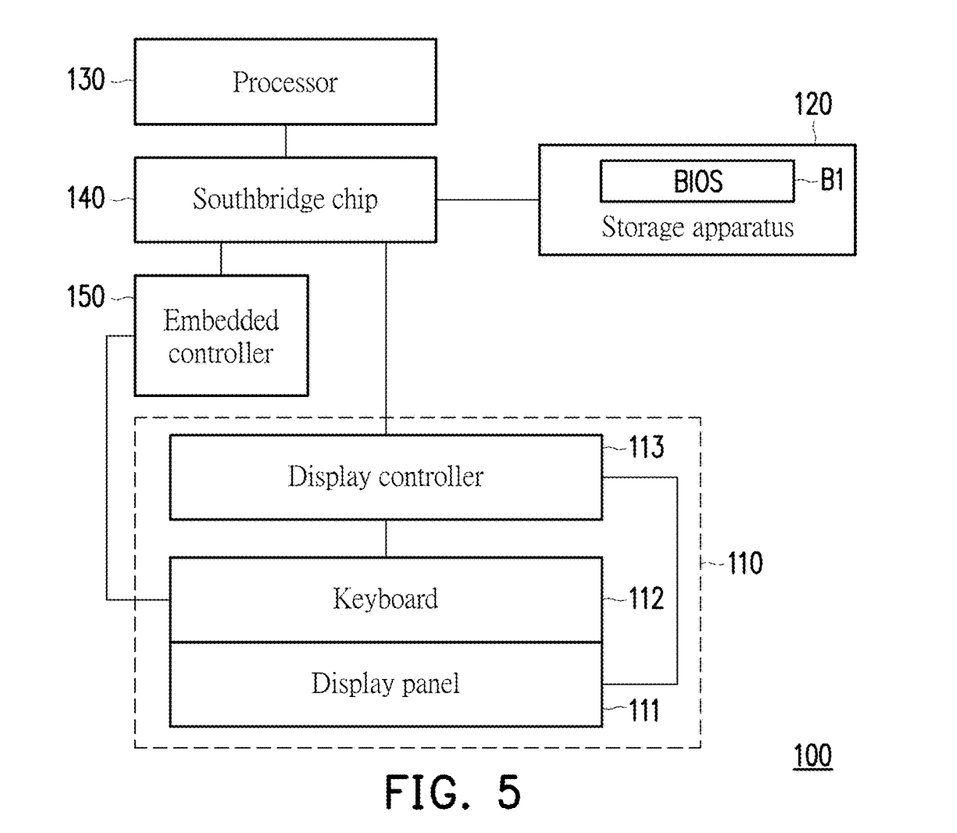
FIG. 5 is a block diagram of an electronic apparatus according to an embodiment of the invention.

FIG. 5 is a block diagram of an electronic apparatus according to an embodiment of the invention. Referring to FIG. 5, in addition to the keyboard module 110, the storage apparatus 120, and the processor 130, the electronic apparatus 100 may further include a southbridge chip 140 and an embedded controller (EC) 150. The southbridge chip 140 is, for example, a platform controller hub (PCH). The southbridge chip 140 is coupled to the processor 130, the storage apparatus 120, and the display controller 113 of the keyboard module 110. The embedded controller 150 is coupled between the southbridge chip 140 and the keyboard 112.

The BIOS B1 may provide the first keyboard layout to the display controller 113 via the southbridge chip 140. Specifically, in some embodiments, the processor 130 running the BIOS B1 may send commands conforming to a specific interface protocol to the display controller 113 via the southbridge chip 140, so as to control the display panel 111 to display various keyboard layouts. In other words, the display controller 113 is responsible for accepting the commands sent by the BIOS B1 and converting them into source/gate driving control signals controlling the display panel 111.

Figure 6:
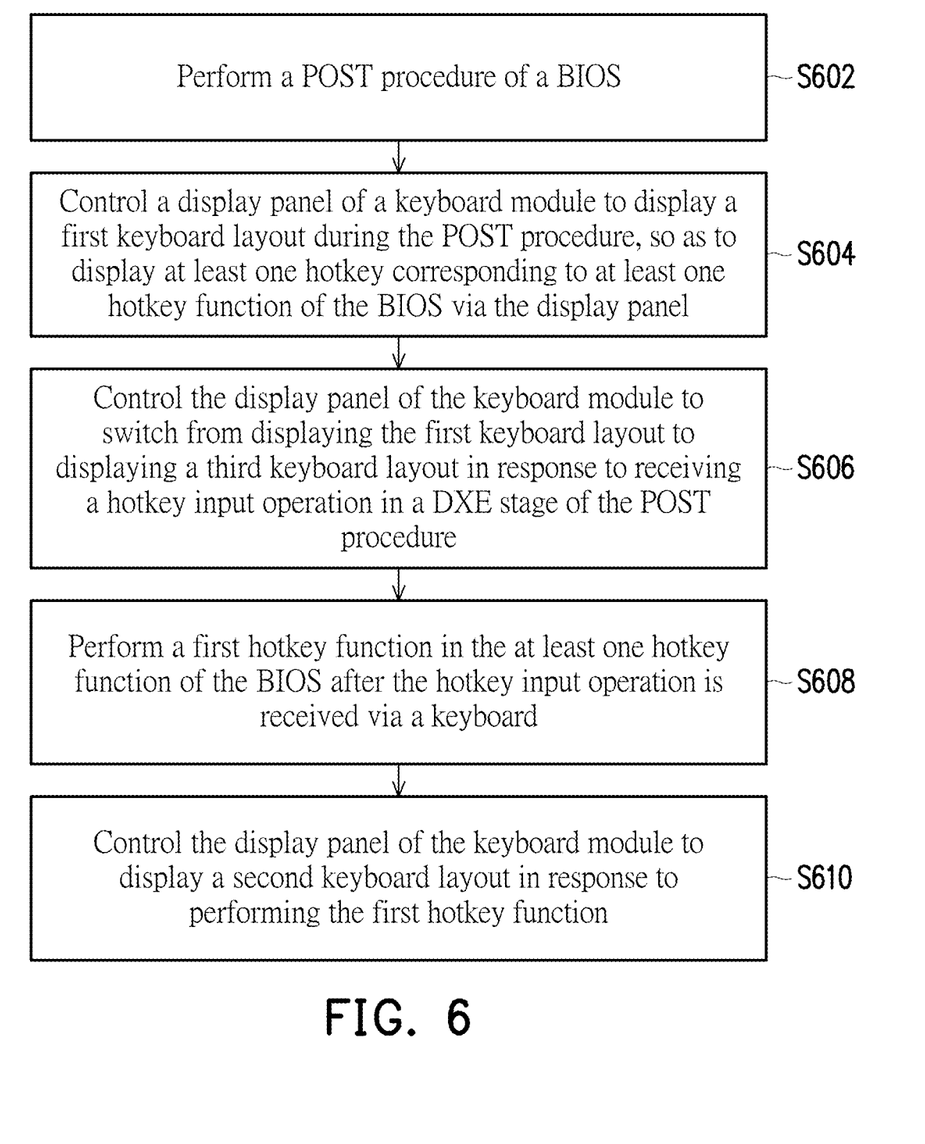
FIG. 6 is a flowchart of a keyboard prompt method according to an embodiment of the invention.
Figure 8:
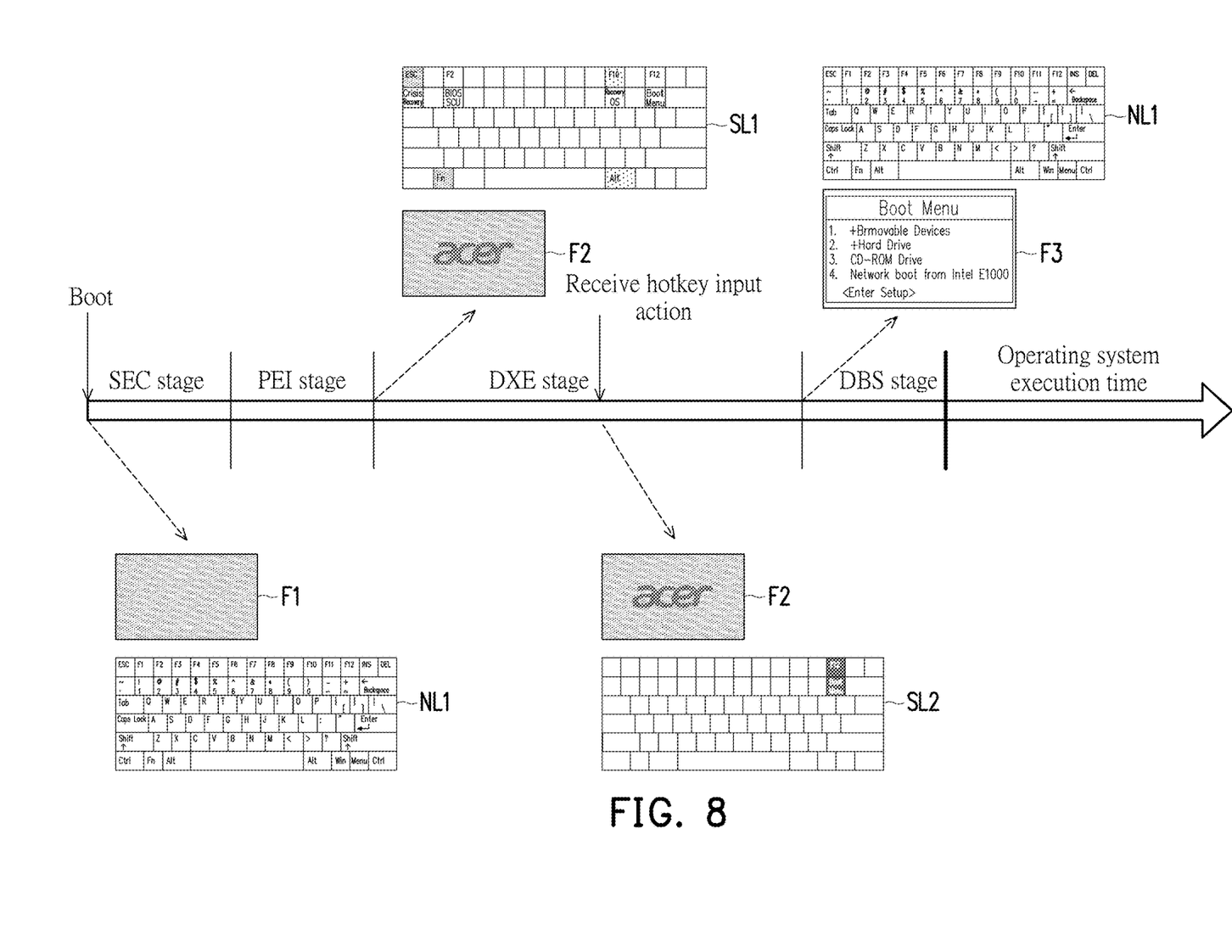
FIG. 8 is a schematic diagram of a situation of a hotkey prompt method according to an embodiment of the invention.

FIG. 6 is a flowchart of a keyboard prompt method according to an embodiment of the invention. Referring to FIG. 6, the method of the present embodiment may be performed by the electronic apparatus 100 of FIG. 5. In addition, in order to make the concept of the invention easier to understand, the following description is supplemented with FIG. 8, wherein FIG. 8 is an application scenario diagram shown according to an embodiment of the invention.

In step S602, when the electronic apparatus 100 is powered on, the processor 130 performs a POST procedure of the BIOS B1, i.e., about to enter the various stages of the POST procedure in sequence.

It should be noted that, when the electronic apparatus 100 is powered off the previous time, the display panel 111 generally displays the second keyboard layout NL1, that is, the standard keyboard layout. Therefore, as shown in FIG. 8, when the electronic apparatus 100 is just turned on, the display panel 111 of the keyboard module 110 displays the second keyboard layout NL1, and the display screen of the electronic apparatus 100 displays a black frame F1. In this example, in the SEC stage and the PEI stage, the display panel 111 of the keyboard module 110 displays the second keyboard layout NL1.

Next, in step S604, during the POST procedure, the processor 130 controls the display panel 111 of the keyboard module 110 to display a first keyboard layout, so as to display at least one hotkey corresponding to at least one hotkey function of the BIOS B1 via the display panel 111. In the example shown in FIG. 8, when entering the DXE stage of the POST procedure, the BIOS B1 initializes the keyboard 112 and the display screen of the electronic apparatus 100. Therefore, after entering the DXE stage, the display screen of the electronic apparatus 100 may display a trademark frame F2, and the display panel 111 of the keyboard module 110 displays the first keyboard layout SL1. In this way, the user may know each of the hotkeys and the corresponding hotkey function thereof by viewing the first keyboard layout SL1.

It should be noted that, in step S606, in response to receiving the hotkey input operation in the DXE stage of the POST procedure, the processor 130 may control the display panel 111 of the keyboard module 110 to switch from displaying the first keyboard layout to displaying a third keyboard layout. The hotkey input operation is used to enable the first hotkey function. In some embodiments, the third keyboard layout only includes the at least one hotkey corresponding to the first hotkey function and the function description information of the first hotkey function. That is, other hotkeys disappear into the third keyboard layout. Moreover, in some embodiments, the at least one hotkey of the first hotkey function is presented in a first display effect in the first keyboard layout, and the at least one hotkey of the first hotkey function is presented in a second display effect in the third keyboard layout. The first display effect is different from the second display effect.

Figure 7:
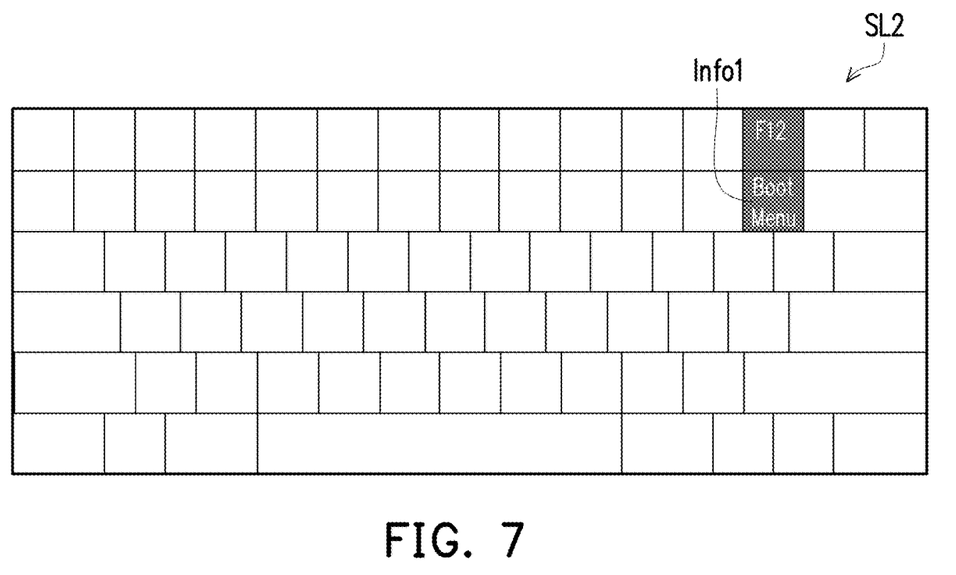
FIG. 7 is a schematic view of a third keyboard layout according to an embodiment of the invention.

Specifically, in response to the user pressing a certain hotkey or a hotkey combination, the display panel 111 is switched to display the third keyboard layout. The third keyboard layout may be regarded as a confirmation feedback for prompting the user that the BIOS B1 has received the hotkey input operation. Thereby, the user does not need to press the hotkey continuously to activate the hotkey function. For example, FIG. 7 is a schematic view of a third keyboard layout according to an embodiment of the invention. Referring to FIG. 4A and FIG. 7 together, it is assumed that the user presses the hotkey "F12" in the first keyboard layout SL1. The display panel 111 is switched to display the third keyboard layout SL2, and the third keyboard layout SL2 only includes the hotkey "F12" corresponding to the enabled hotkey function and the function description information Info1. In addition, the hotkey "F12" in the first keyboard layout SL1 is displayed in black characters on a white background, but the hotkey "F12" in the third keyboard layout SL2 is displayed in white characters on a black background. Therefore, via the display of the third keyboard layout SL2, the user may definitely know that the hotkey input operation is successfully issued.

In step S608, after the hotkey input operation is received via the keyboard 112, the processor 130 performs a first hotkey function of the at least one hotkey function of the BIOS B1. In step S610, in response to performing the first hotkey function, the processor 130 controls the display panel 111 of the keyboard module 110 to display the second keyboard layout.

Specifically, the embedded controller 150 may detect that the user presses a hotkey of a certain hotkey function, and transmits the keyboard code corresponding to the hotkey to the processor 130. Therefore, after receiving the hotkey input operation corresponding to the certain hotkey function in the DXE stage, the processor 130 may set the corresponding function flag to a first value. After entering the BDS stage, the processor 130 checks the setting value of the function flag to determine whether to perform the hotkey function. As shown in FIG. 8, after receiving the hotkey input operation, the processor 130 may perform the hotkey function in the BDS stage, that is, control the display screen to display a boot menu F3. Then, in response to controlling the display screen to display the boot menu F3, the processor 130 may control the display panel 111 to switch from displaying the third keyboard layout SL2 back to displaying the second keyboard layout NL1.

Based on the above, in an embodiment of the invention, the keyboard module having the display panel may prompt the hotkeys supported by the BIOS during the booting process, so that the user may know the hotkey functions and corresponding hotkeys supported by the BIOS without memorizing. Moreover, by changing the keyboard layout presented by the keyboard module during the booting process, not only may the user be notified to press the hotkey at the appropriate time, but also immediate feedback may be provided to the user, thus avoiding unnecessary keystrokes, thus not only significantly reducing the number of hotkeys pressed, but also providing better human-computer interaction.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A hotkey prompt method, suitable for an electronic apparatus comprising a keyboard module, wherein the keyboard module comprises a display panel and a keyboard having a plurality of light-transmitting keycaps, and the method comprises:
   performing a power-on self-test (POST) procedure of a basic input output system (BIOS);
   controlling a display panel of the keyboard module to display a first keyboard layout during the POST procedure, so as to display at least one hotkey corresponding to at least one hotkey function of the BIOS via the display panel;
   performing a first hotkey function of the at least one hotkey function of the BIOS after a hotkey input operation is received via the keyboard, wherein the hotkey input operation is used to enable the first hotkey function; and
   controlling the display panel of the keyboard module to display a second keyboard layout in response to performing the first hotkey function.

2. The hotkey prompt method of claim 1, wherein the method further comprises:
   controlling the display panel of the keyboard module to switch from displaying the first keyboard layout to displaying a third keyboard layout in response to receiving the hotkey input operation in a driver execution environment (DXE) stage of the POST procedure.

3. The hotkey prompt method of claim 2, wherein the third keyboard layout comprises only the at least one hotkey corresponding to the first hotkey function and function description information of the first hotkey function.

4. The hotkey prompt method of claim 2, wherein the at least one hotkey of the first hotkey function is presented in a first display effect in the first keyboard layout, the at least one hotkey of the first hotkey function is presented in a second display effect in the third keyboard layout, and the first display effect is different from the second display effect.

5. The hotkey prompt method of claim 1, wherein the step of controlling the display panel of the keyboard module to display the first keyboard layout during the POST procedure to display the at least one hotkey corresponding to the at least one hotkey function of the BIOS comprises:

controlling the display panel of the keyboard module using the BIOS to display the first keyboard layout before entering a boot device select (BDS) stage of the POST procedure.

6. The hotkey prompt method of claim 1, wherein the second keyboard layout comprises a standard keyboard layout.

7. The hotkey prompt method of claim 1, wherein the at least one hotkey of one of the at least one hotkey function comprises a first hotkey and a second hotkey forming a hotkey combination, and the first hotkey and the second hotkey are presented in a first display effect in the first keyboard layout.

8. The hotkey prompt method of claim 7, wherein the at least one hotkey of another one of the at least one hotkey function comprises a third hotkey and a fourth hotkey forming another hotkey combination, and the third hotkey and the fourth hotkey are presented in a second display effect in the first keyboard layout, wherein the first display effect is different from the second display effect.

9. An electronic apparatus, comprising:
a keyboard module, comprising:
a display panel; and
a keyboard disposed on the display panel and comprising a plurality of light-transmitting keycaps;
a storage apparatus recording a BIOS; and
a processor coupled to the keyboard and the storage apparatus, and configured to:
perform a POST procedure of the BIOS;
control a display panel to display a first keyboard layout during the POST procedure, so as to display at least one hotkey corresponding to at least one hotkey function of the BIOS via the display panel;
perform a first hotkey function of the at least one hotkey function of the BIOS after a hotkey input operation is received via the keyboard, wherein the hotkey input operation is used to enable the first hotkey function; and
control the display panel to display a second keyboard layout in response to performing the first hotkey function.

10. The electronic apparatus of claim 9, wherein the keyboard module further comprises a display controller connected to the display panel, the electronic apparatus further comprises a southbridge chip connected to the processor, and the BIOS provides the first keyboard layout to the display controller via the southbridge chip.

* * * * *